United States Patent [19]

Järvinen et al.

[11] 4,015,923
[45] Apr. 5, 1977

[54] DEVICE FOR PRODUCING EXPANSIONS IN PLASTICS PIPES AND PIPE COMPONENTS

[75] Inventors: Ilkka Järvinen; Erkki Salmela, both of Lahti; Antero Kaikkonen, Nastola, all of Finland

[73] Assignee: Upo Osakeyhtio, Finland

[22] Filed: Jan. 5, 1976

[21] Appl. No.: 646,738

[30] Foreign Application Priority Data

Jan. 20, 1975 Finland .............................. 750127

[52] U.S. Cl. .............................. 425/393; 425/403; 249/180; 249/184
[51] Int. Cl.² ........................................ B29C 17/00
[58] Field of Search ........... 425/392, 393, 394, 384, 425/438, DIG. 14, DIG. 58, DIG. 211, DIG. 218, 403; 264/96, 318; 249/63, 152, 178, 180; 72/393, 398

[56] References Cited

UNITED STATES PATENTS

| | | | |
|---|---|---|---|
| 1,610,982 | 12/1926 | Theberath | 72/393 |
| 3,205,535 | 9/1965 | Niessner et al. | 425/393 |
| 3,557,278 | 1/1971 | Kuhlemann | 425/DIG. 218 |
| 3,677,684 | 7/1972 | Platz | 425/DIG. 218 |
| 3,732,054 | 5/1973 | Lyng | 249/180 |

Primary Examiner—J. Howard Flint, Jr.
Attorney, Agent, or Firm—Ladas, Parry, Von Gehr, Goldsmith & Deschamps

[57] ABSTRACT

A device for producing expansions and in particular inside grooves, such as packing grooves, in plastics pipes and pipe components. The device comprises a form ring for shaping the inside profile of the expansion, the circumference of which ring is divided into two groups of segments, which can be shifted radially inwards so that the form ring can be disassembled and removed from the pipe after shaping of the expansion, a mandrel that can be shifted axially through the form ring, a core body that surrounds the mandrel and in relation to which the mandrel can be shifted axially, and two groups of first inclined faces, in connection with the mandrel, one face group for each segment group, so as to produce radial movement of the segments, for example by forcible controlling, whereby the first group of inclined faces is arranged axially at a distance from the second group of inclined faces. In addition, the device comprises first guide units connected with the core body, second guide units connected with the segments, which second guide units collaborate with said first guide units so that the segments can perform a movement that has a radial component, and loading units, which are arranged so that they continuously push said second guide units inwards.

8 Claims, 6 Drawing Figures

DEVICE FOR PRODUCING EXPANSIONS IN PLASTICS PIPES AND PIPE COMPONENTS

The subject of the present invention is a device for producing expansions and in particular inside grooves, such as packing grooves, in plastics pipes and pipe components, which device comprises
- a form ring provided for the purpose of shaping the inside profile of the expansion, the circumference of which ring is divided into two groups of segments, which can be shifted radially inwards so that the form ring can be disassembled and removed from the pipe after shaping of the expansion,
- a mandrel that can be shifted axially through the form ring,
- a core body or equivalent that surrounds the mandrel and in relation to which the mandrel can be shifted axially, and
- two groups of first inclined faces, in connection with the mandrel, one face group for each segment group, so as to produce radial movement of the segments, for example by forcible controlling, whereby the first group of inclined faces is arranged axially at a distance from the second group of inclined faces.

(In the present specification, the word segment has been given a meaning wider than the geometrical meaning of the word would suppose, and it means the curved pieces that the form ring consists of.)

Such a so-called expanding core construction is intended for use, e.g., in sleeve-shaping and die-casting tools for plastics pipes and pipe components. Its use is concerned in particular when, in the plastics product to be manufactured, there are, for example, packing grooves, which require shrinkage of the core before the product is removed from around the core. When the core is in the expanded state, its outer surface corresponds the desired inside shape of the product, such as a sleeve, packing groove, etc. In such a case it is possible to push a plasticized end of a pipe onto the core, like when shaping sleeves, or to die-cast the plastics around the core. When the core is brought into the shrunken state, the product can be removed from around it.

In some known core constructions, the core or a part of same is made of some elastic raw-material, such as rubber, which can be expanded or shrunk, for example, by means of a pressure medium effective inside the core.

In some other constructions, the circumference of the core is made of fixed pieces, which can be shifted towards or off the core centre. In some solutions these pieces are fixed by articulated joints at one end, and when the core is shrunk or expanded, the pieces are pivoted around their pivot joints at the same time as a part of these pieces constituting the circumference are pulled off in the direction of the longitudinal axis of the core. In some other solutions, the pieces are provided with guides, by means of which they can be moved along corresponding guides built inside the core. The moving of the pieces usually takes place by means of a moving-mechanism in the middle of the core, whose construction depends on the principle of operation and on the construction of the pieces.

The above solution based on elastic deformation of a rubber ring can, however, be used only in sleeve-shaping tools, Its drawback is the lack of dimensional precision resulting from elasticity.

On the other hand, fully mechanical solutions give good dimensional precision, but piece constructions and mechanisms moving them are expensive because of the complicated nature of the components and because of the precise tolerances. Moreover, the pieces and the shifting mechanisms take a relatively abundant space inside the core, which prevents the use of these solutions with small core diameters.

A purpose of the present invention is to eliminate the above drawbacks. This purpose is achieved by the device in accordance with the invention, which is mainly characterized by
- first guide units connected with the core body,
- second guide units connected with the segments, which second guide units collaborate with said first guide units so that the segments can perform a movement that has a radial component, and
- loading units, which are arranged so that they continuously push said second guide units inwards.

By means of the invention, among other things, the following remarkable advantages are obtained:

The end of the pieces next to the guides can be shaped so that the guide can receive a sufficienct length for good guiding quality, which increases the reliability of operation of the tool.

The shifting mechanism of the pieces includes no expensive components which are difficult to manufacture, and its mode of operation is simple and reliable.

As the construction of the shifting mechanism takes relatively little space and as the segment pieces can be even very thin opposite the mantle of the mandrel, it is also possible to construct the mandrel for very small diameters.

The invention will be examined more closely below with the aid of the embodiment in accordance with the attached drawings. FIG. 1 shows the core in the expanded state and as a section along line III —III in FIG. 3.

Figure 1:
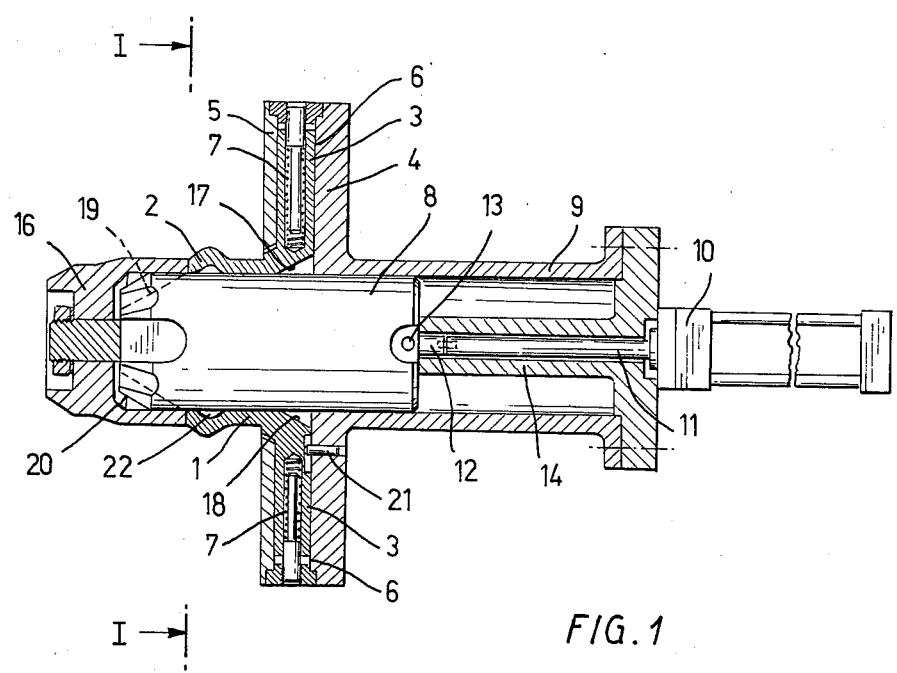

In principle, in the core the mantle (form ring) is divided into segments, whose one end is provided with guides that are, for example by springs, loaded towards the centre line of the core. The pieces move by means of these guides in guide grooves that are placed radially in a plane perpendicular to the centre line of the core. The shifting of the pieces takes place by the mandrel, which can be moved along the axis of the core and which, when moving in one direction, pushes the pieces outwards against an outer power source, such as a spring, and, when moving in the opposite direction, allows the outer force to push the pieces inwards. The part of the mandrel that shifts the pieces is designed so that a correct order of movement is obtained between the different segment groups.

Thus, in the example case, the mantle of the core is divided into pieces or segments 1 and 2. Guides 3 are shaped at the other end of the pieces. The cross-sectional form of the guides is a simple rectangle section. The guides move radially in guide grooves 6 formed by the core body 4 and the front plate 5, which grooves are perpendicular to the core axis. The pieces are continuously loaded inwards by springs 7.

Figure 2:
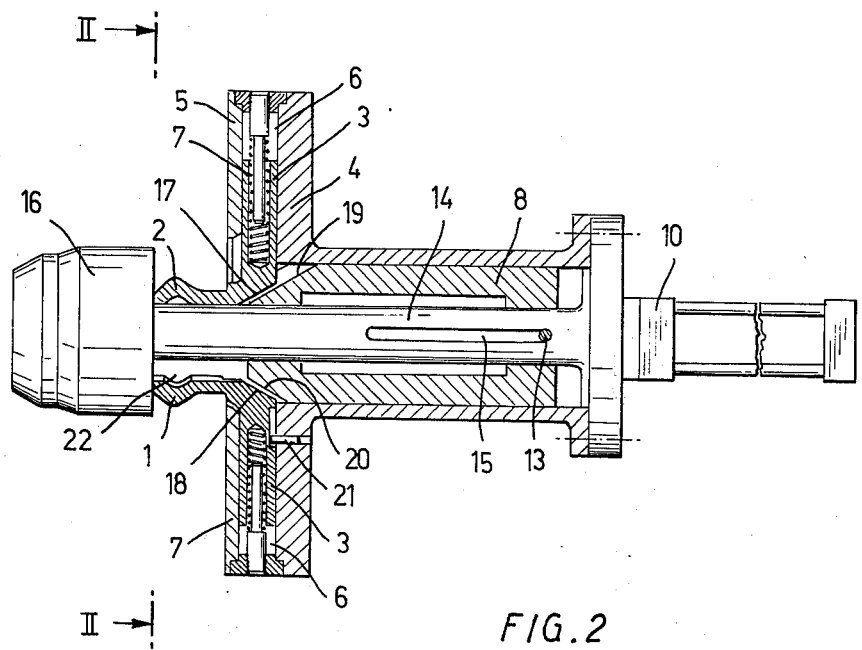
FIG. 2 shows the core in the shrunken state and as a section along line IV —IV in FIG. 4.
Figure 3:
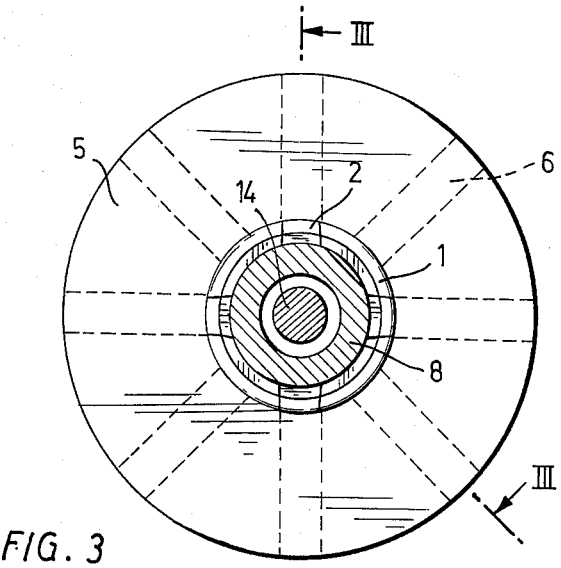
FIG. 3 shows a section along line I —I in FIG. 1.
Figure 4:
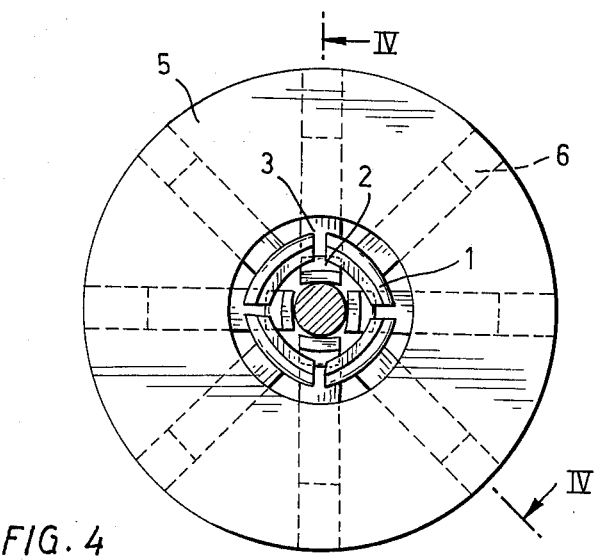
FIG. 4 shows a section along line II —II in FIG. 2.
Figure 6:
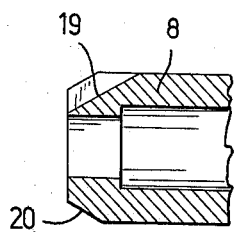
FIG. 6 shows the mandrel as a section along line V —V in FIG. 5.
Figure 5:
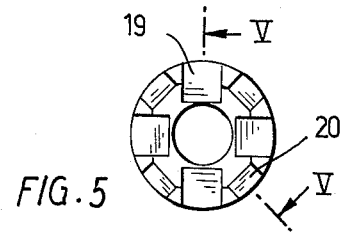
FIG. 5 shows the mandrel that shifts the segment pieces as viewed from the end (e.g. from the direction II —II in FIG. 2).

The shifting of the pieces takes place by means of the mandrel 8, which moves in a tube 9 placed in the body 4, in the direction of the longitudinal axis of the core. The shifting of the mandrel is performed by means of a cylinder 10, whose piston rod 11 moves inside a tube 14. The mandrel is connected to the piston rod by means of an intermediate component 12 and a pin 13, for which the tube 14 is provided with grooves 15. (FIG. 2 shows the grooves on both sides of the tube as one illustration.) The grooves at the same time function as guides of the pin, thereby preventing the mandrel 8 from turning around its centre axis. The core has a fixed tip 16, the segment pieces constituting the part of the core mantle that produces the mouth portion of the sleeve and the packing groove. The tip is fastened to the rest of the device by means of the tube 14.

When the core is in the expanded state, the mandrel 8 is in the position of FIG. 1 towards the left while the springs push the pieces 1 and 2 against the mandrel. When the mandrel moves towards the right, the conical faces 17 at the segments 2 come into contact with the conical faces 19 at the tip of the mandrel, and correspondingly the conical faces 18 of the segments 1 come into contact with the conical faces 20 of the mandrel. All of these conical faces have the same cone angle, but the positions of the conical faces 19 and 20 at the tip of the mandrel are staggered so that the faces 20 are placed closer to the tip of the mandrel than the faces 19. It follows from this that, when the mandrel moves towards the right, the contact between the faces 17 and 19 begins earlier than the contact between the faces 18 and 20, and the segments 2 thus start moving inwards before the segments 1. In this way the correct order of movement is produced between the pieces.

Owing to the constructin of the tip of the mandrel, the conical faces 19 are additionally longer than the conical faces 20, the difference in length corresponding the difference in the distances of movement of the segments 2 and 1. In the core in accordance with the example case, the mandrel is shifted to the right until the segments 2 come into contact with the tube 14 and the segments 1 against the limit pins 21, whereby the core is in the shrunken state in accordance with FIG. 2. It is to be noticed that in the core concerned, when it is shrunken, the highest portion of the mantle of the segment pieces 2 remains partly in the groove 22 in the segments 1, whereby the space remaining inside the core can be utilized with maximum efficiency. While the core is being expanded, the mandrel 8 is shifted to the left, whereby the pieces are, by means of the conical faces described above, shifted outwards from the core centre.

When the segments 1 reach their outer position first, the movement of the segments 2 goes on until they also have reached their outer positions and the core is in the expanded state in accordance with FIG. 1.

Even if, in the examinations above, reference has been made to the use of the device in accordance with the invention in sleeve-shaping and die-casting tools of plastics pipes and pipe components, the device can, of course, also be used for other applications in which an expanding core construction is needed.

The fixed tip component 16 of the core shown in the drawings illustrating the invention is not essential or necessary from the point of view of the invention. The tip component may also be omitted and the core be made shrinking over the entire length of the mantle portion.

The number of the core segments 1 and 2 as well as the shape of the guides 3 may show variety.

The cone angle of the conical faces 18 of the segments 1 may also differ from the cone angle of the conical faces 17 of the segments 2 if this is necessary for the purpose of achieving certain ratios of movement. In such a case, correspondingly, the cone angles of the faces 19 and 20 of the mandrel 8 also differ from each other.

It is evident that the mutual movement of the guide units does not have to be perpendicular to the core axis either, but the movement may also have an axial component. Likewise, the loading units may, instead of springs, be pneumatic or hydraulic devices.

We claim:

1. A device for producing expansions and in particular inside grooves, such as packing grooves, in plastics pipes and pipe components. which comprises
    a form ring for shaping the inside profile of the expansion, the circumference of which ring is divided into two groups of segments which can be shifted radially inwards so that the form ring can be disassembled and removed from the pipe after shaping of the expansion such that in the disassembled position, one group of segments will be situated radially inside the other group of segments, said other group of segments being provided with an internal circumferential groove into which part of the outer circumference of said one group of segments can be located in said disassembled position;
    a mandrel that can be shifted axially through the form ring, and comprising two groups of inclined surfaces, one surface group for each segment group so as to produce radial movement of the segments, the first group of inclined surfaces being arranged axially at a distance from the second group of inlcined surfaces;
    a core body that surrounds the madrel and in relation to which the mandrel can be shifted axially;
    first guide means in connection with the core body; second guide means in connection with the segments and cooperating with said first guide means so that the segments can perform a movement that has a radial component; and loading units arranged on the core body to continuously drive said second guide means radially inwards.

2. A device as claimed in claim 1, wherein said core body comprises a substantially radial flange structure and a cover structure arranged axially opposite said flange structure, and the first guide means comprise spaces defined by said substantially radial flange structure and said cover structure.

3. A device as claimed in claim 1, wherein said second guide means are arranged so as to move in said spaces in the way of pistons.

4. A device as claimed in claim 1, wherein said second guide units are of one piece with their respective segments.

5. A device as claimed in claim 1, wherein the loading units consist of springs.

6. A device as claimed in claim 1, wherein the movement of the second guide units is radial.

7. A device as claimed in claim 1, wherein the movement of the second guide units also has an axial component.

8. A device as claimed in claim 1, wherein said first and second guide units are provided with guide grooves.

* * * * *